J. KUCEWICZ.
SCREW.
APPLICATION FILED APR. 21, 1920.
1,365,508.
Patented Jan. 11, 1921.
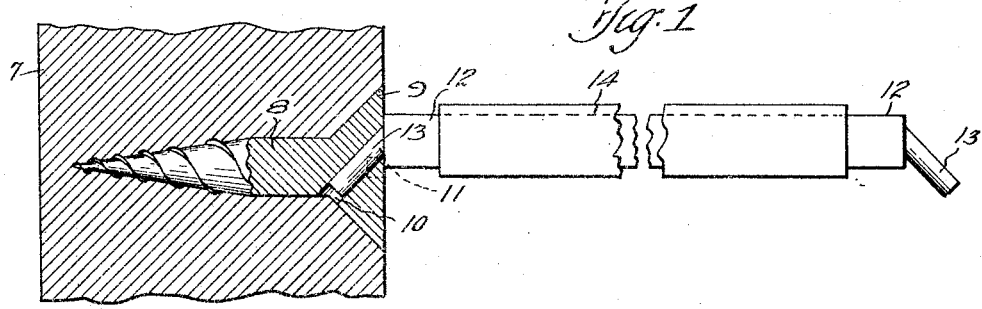
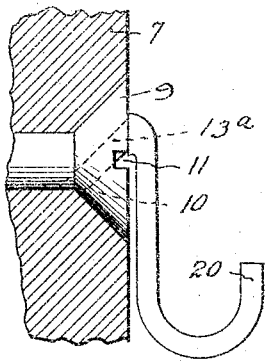
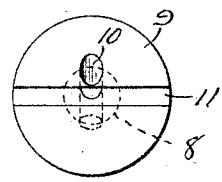
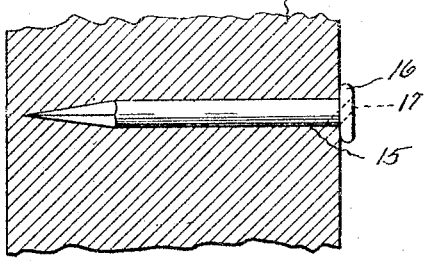
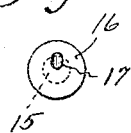
Inventor
John Kucewicz
By John A. Bonnenhardt
Attorney

UNITED STATES PATENT OFFICE.

JOHN KUCEWICZ, OF CLEVELAND, OHIO.

SCREW.

1,365,508. Specification of Letters Patent. Patented Jan. 11, 1921.

Application filed April 21, 1920. Serial No. 375,424.

*To all whom it may concern:*

Be it known that I, JOHN KUCEWICZ, a citizen of the United States, residing at Cleveland, in the county of Cuyahoga and State of Ohio, have invented certain new and useful Improvements in Screws, of which the following is a specification.

This invention relates to screws or the like and devices supported thereby, and has for one of its objects to provide an improved means for supporting a hook, hanger or the like, without the use of any additional brackets or parts. To this end the head of the screw is provided with a hole extending at an inclination into which a shank on a hanger or hook may be engaged to support the latter.

Although referred to in connection with a screw, the invention may be applied to a nail for the same purpose as that indicated above.

The invention is illustrated in the accompanying drawings in which Figure 1 is a sectional view of a screw, showing a hanger supported thereby. Fig. 2 is a side view of the screw supporting a hook. Fig. 3 is a similar view of a nail provided with the invention. Fig. 4 is a plan of the head of the screw. Fig. 5 is a plan of the head of a nail shown in Fig. 3.

A screw is indicated at 8, the head 9 of which is provided with a kerf 11, whereby it may be driven. A bore 10 is formed in the head of the screw, extending inwardly at an inclination to the axis of the screw, and forming a socket adapted to receive whatever may be engaged therein. One use is illustrated in Fig. 1 in which a curtain rod or hanger 12 has an inclined or hooked lug 13 at the end, fitting within the socket 10 referred to. The rod may be made extensible by means of a sleeve 14, and both ends provided with a lug 13, so that each end can be engaged in one of the socketed screws at the opposite sides of a window or door casing for example.

In Fig. 2 a hook 20 is shown, provided with an inclined lug 13$^a$, engaged in the socket 10. It will be understood that the screw will be so set that the socket will incline downwardly and so support the article attached thereto.

In the form shown in Figs. 3 and 5 the head 16 of the nail 15 is provided with a socket 17 which obviously can receive a corresponding shank or an article to be hung from the nail.

It will be obvious from the above that a strong and simple device is provided for attaching hangers and the like, without the use of rivets or brackets, and the cheapness of the device is apparent. The hook or bracket can be quickly detached by removing its lug from the socket, the screw remaining in the wall if desired.

I claim:

The combination with a driven fastening having an inclined bore forming a socket in the outer end thereof, of a hanger having a hooked lug removably fitting in said socket to hang an article from the fastening.

In testimony whereof, I do affix my signature in presence of two witnesses.

JOHN KUCEWICZ.

Witnesses:
 WILLIAM JOHN KUCEWICZ,
 JOHN A. BOMMHARDT.